United States Patent Office 2,805,163
Patented Sept. 3, 1957

2,805,163

PROCESS FOR THE TREATMENT OF MEATS

Beverly E. Williams, San Mateo, Calif., and Ben F. Buchanan, Wheaton, Ill., assignors to International Minerals & Chemical Corporation, a corporation of New York No Drawing. Application August 13, 1953, Serial No. 374,117

7 Claims. (Cl. 99—107)

This invention relates to a method for treatment of meats such as fresh beef, lamb, veal and pork. More particularly, it relates to a method for tenderizing and/or flavor enhancement and alteration. Still more particularly, it relates to a method of tenderizing by the injection of aqueous media into animal tissue, which aqueous media may be water alone, solutions of monosodium glutamate, or glutamate solutions containing one or more enzyme preparations, molds or enzymes derived from microorganisms.

As is well known, portions from certain parts of an animal carcass command a higher price on the market than cuts from other portions of the carcass, chiefly because the higher priced cuts are more tender and thus offer a minimum of resistance to mastication. Customarily meats such as beef, lamb, etc., are aged under refrigeration for a sufficient length of time to permit enzymes naturally present in the tissues to bring about a noticeable tendering effect. This natural aging must be carried out under carefully controlled refrigeration conditions to avoid decomposition of the meat or to minimize growth of surface molds which must be trimmed from the carcass causing appreciable weight loss.

Heretofore certain enzymes derived from the molds aspergillus and certain other proteolytic enzymes have been proposed for use in flavoring and/or tenderizing of meats. It has heretofore been proposed to introduce these enzymes into the meat by pumping suspensions and/or solutions thereof through the vascular system or by injecting the same into the chilled meat or shortly before the meat was to be chilled. Introduction of these enzymes has never proven satisfactory or practical because it has never been possible to regulate and control the activity of the enzyme in order to give uniform tenderization. When proteolytic enzymes were used in accordance with the teachings of Ramsbottom, Paddock, etc., most if not all of the tenderization occurred during the cooking process since the meat was rapidly chilled below any temperature for activity of the enzymes in the cooler. Variation in tenderization, therefore, was brought about not only due to unequal distribution of enzymes, even though large concentrations of the enzyme were used in an effort to attain distribution, but also varied with the temperature at which the meat was cooked and also with the length of time of cooking. Low temperature cooking in conjunction with a long time of cooking, particularly in such meat cuts as roasts, generally gave overtenderized mushy products of an undesirable character. Injection of the proteolytic enzymes into the carcass after the carcass has been chilled and rigor mortis has occurred produces a very unsatisfactory tenderizing since once the meat and fat of the carcass are congealed, distribution of the tenderizing enzyme from the point of injection is limited, resulting in over concentration in the areas adjacent the point of injection.

Further, the proteolytic enzymes have continuous action within fixed temperature ranges and this action must be arrested or stopped before the enzyme action results in over tenderization. Action of these enzymes is retarded to essentially zero activity by low temperatures, i. e., freezing, and stopped by high temperatures, i. e., usually in the cooking temperature range. Thus, the enzyme action is only temporarily arrested when a carcass is refrigerated, and upon rewarming, the enzymes become active until such time as the cooking temperatures again effect deactivation. Such action puts a premium on control which cannot be obtained by processors due to the diverse methods of handling meat after the meat passes from their hands.

In addition to the above methods of treating meat tissue, a slaughtering method has been patented wherein the vacular system blood was flushed from the carcass and at the same time the carcass was cooled by the introduction of a cold fluid under pressure into the vascular system. Such treatment with water or water followed by air injection inflates and enlarges the carcass and organs abnormally. Also when the animal carcass thus treated was subjected to the normal cooling procedure, the chilled carcass exhibited very poor appearance, the meats showed considerable moisture and had a washed out color. Palatability tests on meats so processed showed the meat to be lacking in flavor and tough even after cooking.

It is an object of the instant invention to provide a method which overcomes the limitations and disadvantages of methods heretofore used in tenderizing of meats.

It is a further object of this invention to provide a method whereby the tenderness of fresh meat will be improved without in any way detracting from other desirable qualities of the meat.

It is a further object of this invention to provide a method whereby the meat can be rendered uniformly tender throughout its bulk.

It is a further object of this invention to provide a method whereby the objectionable "bland" or "green" flavor of meat may be converted to an "aged" flavor without in any way detracting from other desirable qualities of the meat.

These and other objects of this invention will be apparent to those skilled in the art from the description which follows.

By the method of this invention the desirable results attendant to normal aging are secured without the lapse of time required for normal aging. Also by this method the tenderness of high quality meats may be improved and mediocre meats may be treated to attain tenderness and flavor normally found in higher quality meat cuts.

The present invention contemplates the treatment of animal tissue with a warm aqueous medium to maintain the temperature of or to elevate the temperature of the animal tissue immediately after killing the animal, thus prolonging the cooling period during which period tenderizing and/or flavor change is effected. The carcass may be handled in such manner that the carcass temperature is maintained at or above normal animal body temperature for a proper activation period of not more than about two hours prior to customary chilling to meat refrigeration storage temperature of about 32° F. to about 45° F.

It has been found that tenderizing of edible meat products is obtained when water at least equivalent in amount to the amount of moisture lost from a carcass immediately after slaughter, i. e., during the initial chilling and cooler storing periods, is introduced before inception of rigor mortis into the carcass at or above animal body temperature. For beef the moisture loss or shrinkage is about 1% of its carcass weight during the first 24 hours of chilling, and approximately 1% to 2% during about each 7 days of "hanging" or "aging," variations, of course, occurring depending upon quality of meat, the type of cut and the conditions of storage. Shrinkage of other meats such as lamb and veal is slightly greater than for beef.

In the treatment of meat, the aqueous medium is injected into the various muscles and sections of the carcass immediately after slaughter and evisceration, while the tissues are still warm and flaccid, in quantities averaging between about 1% and about 3% of the warm weight of the freshly dressed carcass. The temperature of the aqueous medium, being about or above animal body temperature on the killing floor tends to maintain or to elevate slightly the temperature of the carcass. Injection of the aqueous medium into the muscular tissue is made indirectly through the vascular system or directly by a procedure known as "stitch pumping" or both. The warm fluid will be accepted, absorbed and retained by the unset meat tissue. If the injection is made through the vascular system, the liquid is maintained under sufficient pressure to force the fluid into the extending capillaries, i. e., about 5 to about 15 pounds per square inch gauge.

The temperature of the injected medium is generally in the range of about 100° F. to about 125° F., the temperature varying with the quantity of water it is desired to inject and also being limited by the deactivation temperature of any enzyme materials which may be incorporated therein. Also the temperature of the fluid should not be so high as to cause searing or cooking of the meat.

The elevation of the temperature of the carcass the slower rate of chilling provides opportunity for accelerated changes within the meat and thus results in producing a meat of improved appearance, brighter color, as well as some improvement in tenderness.

If in addition to treating the meat as before described, an alkali metal salt of glutamic acid such as monoammonium glutamate, monosodium glutamate, monopotassium glutamate, and the like, is added to the aqueous medium, a change in flavor is obtained in a matter of days as compared to weeks in the normal "aging" process.

Freshly slaughtered beef, lamb, veal and pork has a bland, "green," and often objectionable flavor. The characteristic full, rich meat flavor known as "aged" flavor for each type of meat does not begin to develop until such meat is stored for approximately a week or more. Optimum "aged" flavor requires in the neighborhood of 3 weeks for development. When, however, for example, monosodium glutamate is introduced into fresh killed meat in accordance with the above described technique, the "aged" flavor is definitely perceptible in one day and after two or three days it is difficult to distinguish between this accelerated "aged" flavor and the normal "aged" flavor. Where beef, lamb, veal and pork carcasses or cuts are treated in accordance with the above described process and marketed through normal channels of distribution, they need only to be thoroughly chilled so as to impart firmness to the meat for handling and cutting purposes, but do not need further cooler storage for commercial acceptability.

The quantity of monosodium glutamate added to the treatment water will range from about 0.5 ounce (about 3%) to about 3 ounces (about 20%) per pound of injection solution with about one ounce of monosodium glutamate per pound of solution preferred. Such quantities of monosodium glutamate in addition to changing the flavor, also improve the tenderness of the meat over and above that attributable to water treatment alone.

When referring to glutamates, it is intended that such compositions shall include crude glutamate preparations such as protein hydrolysates.

When tenderness alone is sought and quick attainment of "aged" flavor is not of paramount consideration, tenderizing agents such as proteolytic enzyme preparations, molds and enzymes derived from microorganisms can be incorporated in the aqueous media and the meat treated in accordance with the above described technique. The amount of enzyme which may be incorporated without deleterious effects such as over tenderizing is much smaller than that utilized for enzyme tenderizing treatments heretofore known. The exact amount of enzyme varies with the particular type of enzyme and the different types of meat. In general in the prior art such workers as Ramsbottom, etc. taught injection of a solution containing about 0.01% of papain by weight and injecting an amount of solution equal to about 6% of the weight of the meat. Use of amounts of enzyme solutions of the same strength as used by Ramsbottom in excess of even 0.5% of the meat weight in the method of the instant invention results in over tenderizing.

Treatment according to our above described process with enzymes such as trypsin, pepsin, papain, macin and ficin and the like is not limited as heretofore to use where the meat will be quickly subjected to deactivating temperatures such as in the cooking of steaks and chops. If the mold, or enzyme cultured from the mold Thamnidium, is used alone or in a mixture of enzymes cultured from molds of such families as Myxomycetes, Ascomycetes, Phycomycetes, and *Fungi Imperfecti*, limitation of enzyme quantity is not such a critical factor. The use of these enzymes and molds is less critical because their activity is rapidly diminished during refrigeration and they become substantially inactive after about two weeks.

In this invention it is possible to use either the crude or purified proteinase and/or peptidase enzymes cultured by known laboratory means from the mold Thamnidium. The mold Thamnidium is quite different from Aspergillus as taught by Jensen, U. S. Patent 2,221,689, and is very little known commercially; its enzymes have never been used before in the treatment of meats. Like Aspergillus, the mold Thamnidium contains a great number of enzymes, but the two of paramount importance in the treatment of meats are proteinase and peptidase.

The class, order, family and genus of Thamnidium and Aspergillus are as follows:

Class:
    Ascomycetes      Phycomycetes
Order:
    Aspergillales      Mucorales
Family:
    Aspergillaceae      Mucoraceae
Genus:
    Aspergillus      Thamnidium The class of Ascomycetes has septate mycelium gametes and is always non-motile. Gamete neuclei do not fuse immediately after fusion of gametes. Gamete neuclei fuse in an ascus. Meiosis occurs in ascus. A definite number of spores is produced within the ascus. These spores are formed by free cell formation, as opposed to cleavage.

Thamnidium belongs to the class of Phycomycetes which class is characterized by mycelium being rarely septate. Sexual reproduction is by means of gametes that are either motile or non-motile. Gametes are always heterogomous or isogomous. After fusion of gametes, there is production of a resistant zygote or a diploid plant. There is production of either spores of conidia. The spores are formed by cleavage.

*Flavus Oryzae* belongs to the *Fungi Imperfecti*. This class is characterized by having no sexual reproduction, or at least no known sexual reproduction. Some of the members of this class are related to Ascomycetes but rarely to the Phycomycetes. Therefore, it will be seen from the following chart, which lists class, family and genus, that Aspergillus, Thamidium and Flavus Oryzae belong to separate classes, which is the highest magnitude of difference and still be fungi.

| Ascomycetes | Phycomycetes | Fungi Imperfect |
|---|---|---|
| Aspergillaceae | Mucoraceae | Monillaceae |
| Aspergillus | Thamnidium | Aspergillus |
|  |  | Flavus Oryzae |

Enzymes have been cultured and applied from the mold Thamnidium, which mold is not unnatural to meat and grows on meat and forms "whiskers" during the natural aging process, provided the conditions are right and conducive for the growth of this mold. The existence of enzymes derived from the mold Thamnidium has been so recently recognized that this entire system has not been distinguished or classified, except for the two above mentioned enzymes, and they are, therefore, referred to as the end product or enzymes of the mold Thamnidium.

The enzyme papain is representative of the enzymes currently commercially available. This enzyme can be isolated for use by salting-out methods similar to those used for recovery of other proteolytic enzymes. The product extracted from undried papaya latex by water can be fractionated by 0.4% concentration with ammonium sulfate and almost complete saturation with sodium chloride. At 5° C. and pH 6, the crystals of papain are almost completely salted out by 2% sodium chloride. While this procedure produces pure crystalline papain, preparations containing crude papain or other proteolytic enzymes are commercially available and are acceptable for use in the process above described.

Cultures containing the enzymes of Thamnidium may likewise be prepared by methods common to enzyme recovery. The cultures may be made by seeding on agar to which is added a carbohydrate, for example, 1% sucrose. The organisms will grow and will elaborate the desired proteases in standard type of media such as bran broth, soya bean mash, beef extract, etc. The enzymes may then be prepared in fluid form and refrigerated for extended periods or may be dried to a stable powder under vacuum at low temperature. Such enzyme powders would then be dissolved and/or dispersed in the injection fluid.

Temperatures of enzyme solutions and/or dispersions at the time of injection may vary from animal body temperature on the killing floor to somewhat below enzyme deactivation temperature, i. e., from about 98° F. to about 120° F. or 125° F. for most enzymes although some strains of enzyme materials such as papain may have a higher deactivation temperature.

The amount of typical commercial enzyme preparation alone which will effectively tenderize meat when utilizing the method of introduction above described ranges between about 0.0005% and about 0.002% based upon meat weight.

When used individually, water, alkali metal glutamates and enzymes each have a definite recognizable effect. When glutamates and enzymes are prepared as water solutions and injected into the meat jointly or as separate solutions, in accordance with the above described procedure, the same degree of tenderizing may be attained for any fixed amount of monosodium glutamate with only about 1/5 to about 1/2 or less of the amount of enzyme necessary when utilizing only enzymes alone. This smaller amount of enzyme in combination with glutamates provides controlled tenderization during the cooling period. During the holding period in the cooler at temperatures generally in the range between about 32° F. and about 45° F., the enzyme activity becomes substantially lessened or dissipated, so that little if any additional tenderizing takes place during the cooking as a result of the treatment with additives. This reduced activity during cooking substantially eliminates the objectionable and uncontrollable variables, i. e., the temperature of cooking and rate of heating, which contributed so greatly to the commercial nonacceptability of meats processed in accordance with prior known tenderizing methods.

For convenience of handling in the above process, glutamates and enzymes may be prepared in concentrated wet form or in dry form requiring dissolution in water. Injection fluids may have incorporated therein additives such as gelatin and/or edible water soluble gums, i. e., gum arabic, Irish moss, etc., which tend to firm up pockets of injected fluid when the treated meat cools. Ascorbic acid may also be incorporated in the injection fluids. When using combinations of enzyme and glutamate, the quantity of enzyme will vary with the particular enzyme, the amount of glutamate added, and the type of meat to be tenderized.

In general, a tenderizing composition for use in the instant process on a dry basis contains from one to five parts by weight of a commercial enzyme preparation to between about 5,000 and about 10,000 parts by weight of, for example, monosodium glutamate. Such dry compositions will dissolve for use in sufficiently relatively sterile water to make an injection medium which when used in amounts of between about 1% and about 3% by weight of the meat treated will provide about 0.0002% to about 0.001% by weight of enzyme based on the weight of the meat treated and about 5% to about 20% by weight of monosodium glutamate to provide between about 0.05% and about 0.6% of monosodium glutamate based on the weight of the meat treated when the solution is used in the proportions set forth herein. Compositions of the higher percentage ranges generally are utilized for beef, while the lower percentage compositions are generally utilized for treatment of other meats such as lamb and veal.

The invention will be further understood by reference to the following examples which are given by way of illustration and without any intention that the invention be limited thereto.

EXAMPLE I

A freshly killed steer had a hot dressed weight of approximately 600 pounds. The warm animal immediately after slaughtering and dressing was divided into sides each weighing approximately 300 pounds. The left half of this beef was "stitch pumped" with water in 10 locations so that approximately three-fourths of a pound of fluid was injected into the round, three-fourths of a pound of fluid into the loin and rib set, three-fourths of a pound of fluid into the chuck and the remaining three-fourths of a pound of fluid into the rough cuts. The injections were made with water of approximately 120° F. temperature while the carcass was still at approximately body temperature of about 98° F. This treated carcass was chilled over a period of approximately 48 hours, i. e., under normal conditions applied to meat in the regular commercial handling thereof, and stored at a temperature of approximately 35° F. The untreated half of the beef was chilled and stored under the same conditions.

After 10 days storage the meat was cut and approximately the corresponding meat cuts cooked and organoleptically tested. Results are shown in Figure I following.

EXAMPLE II

A freshly killed steer having a hot dressed weight of approximately 600 pounds was divided after slaughtering and dressing into sides weighing approximately 300 pounds. The left half of this beef was "stitch pumped" with an aqueous fluid containing approximately 0.001% by weight of Thamnidium preparation in 10 locations so that approximately the same distribution of fluid was attained as in Example I. Injections were made while the carcass was still at approximately 98° F. temperature. The treated carcass was chilled over a period of approximately 48 hours to refrigeration temperature and stored at a temperature of approximately 35° F.

The right half of the beef was "stitch pumped" with water in 10 locations so that approximately the same distribution was effected as was obtained in the left half in Example I.

After 10 days storage the meat was cut and approximately the corresponding cuts organoleptically tested. Results are shown in Figure I following.

EXAMPLE III

A freshly klled lamb had a hot dressed weight of approximately 40 pounds. The warm round-dressed lamb was split into sides of approximately 20 pounds each for comparative tests. The left half of the lamb was "stitch pumped" with water in 7 locations so that approximately one-tenth pound of fluid was injected in the leg, one-tenth into the loin, one-tenth into the rib and one-tenth of a pound into the chuck including the neck and shank. The injections were made with water of approximately 120° F. while the carcass was still at an approximately lamb body temperature of 98° F. This treated carcass was chilled to refrigeration temperatures over a period of approximately 24 hours and stored at a temperature of approximately 35° F. The untreated right half of the lamb was chilled and stored under the same conditions.

After 7 days storage, the lamb was cut and corresponding portions cooked and organoleptically tested. Results are shown in Figure I following.

EXAMPLE IV

A freshly klled lamb had a hot dressed weight of approximately 40 pounds. The dressed lamb was split into sides of approximately 20 pounds each for comparative tests. The left half of this lamb was "stitch pumped" with a water solution of monosodium glutamate having a monosodium glutamate concentration of approximately 5 percent by weight. This solution was injected in 7 locations so that approximately the same distribution was obtained as in the treated left half of the lamb in Example III.

The right side of this lamb was "stitch pumped" with water in 7 locations so that approximately the same distribution of water was obtained as was obtained in the left half of the lamb treated in Example III. The injections were made with aqueous media of approximately 120° F. temperatures while the carcass was still at approximately lamb body temperature of 98° F.

Both halves of the lamb were chilled over a period of approximately 24 hours and stored under the same conditions of refrigeration at approximately 35° F.

After 7 days storage the lamb was cut and corresponding portions cooked and organoleptically tested for flavor and tenderness. Results are shown in Figure I following.

EXAMPLE V

A freshly killed lamb had a hot dressed weight of approximately 40 pounds. The warm round-dressed lamb was split into sides of approximately 20 pounds each for comparative tests. The side of the lamb was "stitch pumped" in 7 location with a water solution containing approximately 0.00075% of commercial papain. Injections were made so that approximately the same distribution of solution was injected into the various portions as explained in Example III. The right side of the lamb was "stitch pumped" with water in 7 locations also to obtain a distribution approximately the same as obtained for the left side of the lamb of Example III. Both halves of the lamb were chilled simultaneously to refrigeration temperature over a period of approximately 24 hours and stored together at a temperature of approximately 35° F.

After 7 days storage the meat was cut and approximately their corresponding cuts cooked and organoleptically tested. Results are shown in Figure I following.

EXAMPLE VI

A lamb split into halves of approximately 20 pounds each as explained in Examples III, IV and V above was treated as follows. The left half of the lamb was "stitch pumped" with a solution containing approximately 0.00075% of commercial papain by weight and approximately 5% of monosodium glutamate by weight. This solution was injected in 7 locations so that approximately the same fluid distribution was obtained as in the other examples. The injection solution was at a temperature of approximately 120° F. and the carcass at the time of injection was approximately killing floor temperature of 98° F. The right half of the carcass was injected with water to obtain a treatment corresponding to the treatment of the left half of the lamb in Example III. Both halves of the lamb were chilled together in approximately 24 hours to refrigeration temperature and stored together at a temperature of approximately 35° F.

After 2 days storage, the meat was cut and corresponding chops cooked, and organoleptically tested as shown under VIa of Figure I. After 7 days storage, the balance of the lamb was cut and the corresponding cuts organoleptically tested as shown under VIb of Figure I.

The organoleptical testing of the various meats was by a test panel of three or more qualified persons determine a rating as to tenderness and as to flavor, and is recorded as an average result based upon scoring in accordance with the following scale.

*Grade description*

10 Perfect
9 Excellent
8 Very good
7 Good
6 High average
5 Average
4 Low average
3 Fair
2 Poor
1 Very poor
0 Unacceptable NOTE.—Fit your scores under one of the three descriptive terms which have been underlined and then make any further distinctions from there for your final scores.

For tenderness, consider scores of 9 or 10 optimum tenderness.

With any tenderness score under 9, please write in below the score "tough" or "tender" to indicate whether the meat tends to be tough or to be too tender.

FIGURE I

| Example | Aging (days) | Type of Meat | Cut of Meat | Treatment | | Rating | | | |
|---|---|---|---|---|---|---|---|---|---|
| | | | | | | Tenderness | | Flavor | |
| | | | | Left Side | Right Side | L. S.[1] | R. S.[2] | L. S.[1] | R. S.[2] |
| I | 10 | beef | loin | water | none | 6 | 5 | 6 | 5 |
| II | 10 | ...do | ...do | Thamnidium Enzyme | water | 8 | 6 | 8 | 6 |
| III | 7 | lamb | loin chops | water | none | 7 | 6 | 7 | 6 |
| IV | 7 | ...do | ...do | monosodium glutamate | water | 8 | 7 | 9 | 7 |
| V | 7 | ...do | ...do | papain | ...do | 8 | 7 | 8 | 7 |
| VIa | 2 | ...do | ...do | monosodium glutamate and papain | ...do | 9 | 5 | 9 | 5 |
| VIb | 7 | ...do | ...do | ...do | ...do | 10 | 8 | 10 | 7 |

[1] Left side.
[2] Right side.

Having thus fully described and illustrated the character of my invention, what is desired to be secured and claimed by Letters Patent is:

1. A process for tenderizing and improving the flavor of fresh meat and of reducing the time required for aging to produce a satisfactorily aged fresh meat, which comprises injecting from about 1% to about 3% by weight of the meat treated of an aqueous solution containing up to about 20% of a glutamate selected from the group consisting of the monosodium, monopotassium, and monoammonium salts of glutamic acid and mixtures thereof, and a proteolytic enzyme in an amount to supply up to about 0.002% of said enzyme by weight of the meat treated, said solution being injected into the muscle tissue of freshly killed and dressed animal carcass while the tissues are still warm and flaccid, said solution being at a temperature between about the normal body temperature of the animal and about 125° F., and thereafter aging the fresh carcass under the usual refrigeration temperature conditions.

2. The process of claim 1 wherein the solution contains a sufficient amount of proteolytic enzyme to supply from about 0.0005% to about 0.002% by weight of the meat treated.

3. The process of claim 1 wherein the solution is injected by stitch pumping.

4. The process of claim 1 wherein the glutamate is monosodium glutamate.

5. The process of claim 1 wherein the enzyme is papain.

6. The process of claim 1 wherein the enzyme is derived from the mold Thamnidium.

7. The process of claim 1 wherein the enzyme is ficin.

References Cited in the file of this patent

UNITED STATES PATENTS

| Number | Name | Date |
|---|---|---|
| 203,682 | Wheat | May 14, 1878 |
| 2,043,392 | Paddock et al. | June 9, 1936 |
| 2,135,334 | Guthrie et al. | Nov. 1, 1938 |
| 2,140,781 | Allen | Dec. 20, 1938 |
| 2,221,689 | Jensen | Nov. 12, 1940 |
| 2,471,282 | Paddock | May 24, 1949 |
| 2,528,204 | Zwosta | Oct. 31, 1950 |
| 2,553,533 | Komarik et al. | May 15, 1951 |

OTHER REFERENCES

"Microbiology of Meats," 1945, by L. B. Jensen, published by The Girard Press, Champaign, Illinois, pages 161, 248, 249 and 250.

UNITED STATES PATENT OFFICE

CERTIFICATE OF CORRECTION

Patent No. 2,805,163 September 3, 1957

Beverly E. Williams et al.

It is hereby certified that error appears in the printed specification of the above numbered patent requiring correction and that the said Letters Patent should read as corrected below.

Column 2, line 14, for "vacular" read -- vascular --; line 27, for "in tenderizing" read -- for tenderizing --; column 3, line 26, after "carcass" insert -- and --; column 4, line 65, for "Thamidium" read -- Thamnidium --; column 7, line 51, for "The side" read -- The left side --; column 8, line 33, after "persons" insert -- to --.

Signed and sealed this 29th day of October 1957.

(SEAL)
Attest:

KARL H. AXLINE
Attesting Officer

ROBERT C. WATSON
Commissioner of Patents